United States Patent
Luthe

[11] 3,713,660
[45] Jan. 30, 1973

[54] METAL SEAL FOR A CONTROL VALVE OR THE LIKE

[75] Inventor: Fred J. Luthe, Marshalltown, Iowa

[73] Assignee: Fisher Controls Company, Inc., Marshalltown, Iowa

[22] Filed: Nov. 10, 1970

[21] Appl. No.: 88,433

[52] U.S. Cl. ............................ 277/206 R, 220/46 MS
[51] Int. Cl. ............................................... F16j 15/08
[58] Field of Search....277/206 R, 212 C; 220/46 MS

[56] References Cited

UNITED STATES PATENTS

| 3,341,212 | 9/1967 | Bagnard et al. | 277/206 |
| 3,163,431 | 12/1964 | Tanner | 277/206 |
| 3,554,567 | 1/1971 | Carroll et al. | 277/206 |
| 2,366,161 | 1/1945 | Tweedale | 277/206 |

Primary Examiner—Joseph R. Leclair
Assistant Examiner—Robert I. Smith
Attorney—John D. Upham, William J. Bethrum and Harold R. Patton

[57] ABSTRACT

A metallic seal for maintaining a seal between mating parts of a control valve, or the like, notwithstanding substantial thermal expansion, contraction or shock conditions. The seal is characterized by an annular body of stiff, resilient metal formed to have a generally U- or V-shaped cross section. The upper and lower disk-like portions of the seal are joined by an integrally-formed hinge provided along the inside or outside diameter of the annular body, depending upon whether the seal is designed to receive high pressure internally or externally. The hinge portion of the annular body is thin in comparison to the upper and lower disk-like portions so that the deflection of the hinge portion occurs substantially within the plastic region (i.e. as a result of stresses above the yield strength thereof), while the deflection of the disk-like portions occurs within the elastic region (i.e. stresses below the yield strength thereof). In this manner the metal seal exhibits the combination of substantial load-carrying and elastic deflection characteristics similar to that of a spring element.

5 Claims, 10 Drawing Figures

PATENTED JAN 30 1973

INVENTOR
FRED J. LUTHE
BY Harold R. Patton
ATTORNEY

METAL SEAL FOR A CONTROL VALVE OR THE LIKE

BACKGROUND OF THE INVENTION

The present invention relates generally to a metallic seal, and more particularly to a self-sealing, metal seal for use with a control valve or the like, the temperature cycling of which results in substantial thermal expansion and contraction of its constituent parts.

Heretofore, it has been the general practice to employ flat, disk-like seals between various mating parts of fluid carrying apparatus, such as pipe couplets, control valves, and the like. Some such seals have not proven satisfactory where the mating parts have substantially different coefficients of thermal expansion and are used in applications where extreme temperature cycling takes place. For example, control valves used to control the flow of steam in a pipeline are often comprised of a valve body together with an internal cage member which is fitted within the valve body to form a valve seat and a guide for the travel of a reciprocating valve plug. Oftentime, the valve body and the cage member have different coefficients of thermal expansion, such that temperature cycling of the valve via that of the fluid therethrough, results in expansion or contraction of the fitted-together members. The expansion and contraction may result in unacceptable loosening of the seal between the cage member and valve body or in the crushing of the seal, depending on whether the valve body and member expand away from or toward each other, respectively. Either result may lead to fluid leakage.

Annular expandable metal seals having C-, U- or V-shaped cross-sections are available and well known. These seals generally have a cross-section which is of a uniform or constant area throughout, or where the upper and lower leg portions have a cross-sectional area or thickness which is substantially less than that of the portion which joins together. Although these seals are capable of sustaining substantial loads, they do not exhibit the necessary spring-action or deflection and recovery characteristics suitable for a seal which must carry a substantial load and at the same time exhibit sufficient deflection characteristics to deflect and recover a substantial amount to maintain a leakproof seal under temperature cycling conditions.

SUMMARY OF THE INVENTION

The self-sealing, metallic seals of the present invention comprise an annular body of resilient metal having upper and lower disk-like members which are joined together by an integral hinge member. The ratio of the thickness of the hinge member to that of either of the disk-like members is chosen such that, in use, the hinge member undergoes substantial plastic deflection while the disk-like members undergo elastic deflection. In some cases such action can be achieved where such ratio is less than one. Employing such design characteristics, the seal is capable of providing a leak-proof seal notwithstanding substantial temperature cycling of the mating parts between which it is confined.

An object of the present invention is the provision of a self-sealing, metallic seal which can be fitted into a narrow, confined space, and yet have substantial load-carrying and elastic deflection characteristics similar to a spring.

Another object of the present invention is the provision of a self-sealing, metal seal which may be employed between closely-fitted mating parts of a control valve to provide an effective leakproof seal under expansion and contraction conditions.

Yet another object of the present invention is the provision of a metal seal having portions which have either plastic or elastic deflection characteristics, the combination of such portions providing a compact seal for carrying large loads and, in addition, providing substantial deflection and recovery characteristics.

DETAILED DESCRIPTION OF PRIOR ART SEALS

Figure 1A:
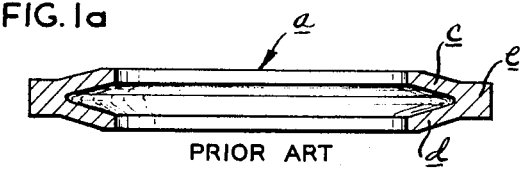
FIGS. 1a and 1b are cross-sectional views of typical prior art annular, metallic seals.
Figure 1B:
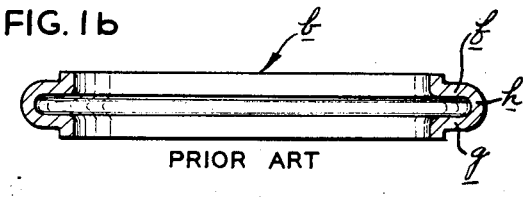

Referring now to FIGS. 1a and 1b, there are shown two typical prior art metal seals generally designated a and b, respectively. The metal seal a is generally annular in overall shape and has a V-shaped cross-section, whereas the metal seal b is generally C-shaped in cross-section. It should be noted that the leg portions c and d of the metal seal a have a cross-sectional area which is substantially less than the cross-sectional area of its hinge e which connects these leg portions. The metal seal b has leg portions f and g which similarly have cross-sectional areas, each substantially equal to that of the hinge h by which they are joined.

It has been found that in loading either of the metal seals a or b, substantially all of the deflection is taken by the leg portions c, d and f, g, respectively, and that there is little or no deflection afforded by the hinges e and h which connect these upper and lower leg portions. As a result, these metal seals are limited in their application and do not prove to be satisfactory for applications where a significant deflection and recovery of the seal is important to its overall operation.

DETAILED DESCRIPTION OF INVENTION

Figure 2:
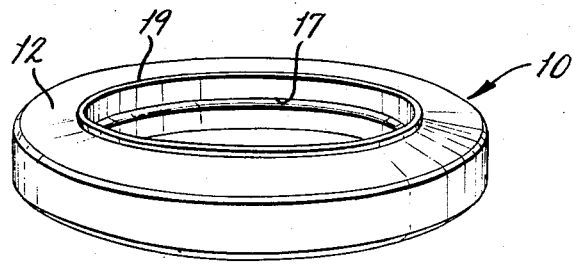
FIG. 2 is a perspective view of a preferred embodiment of the seal of the present invention useful in applications where internal seal pressure aids the sealing action thereof.
Figure 3:
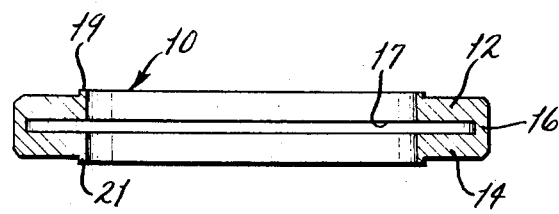
FIG. 3 is a cross-section view of the spring seal of FIG. 2.
Figure 8:
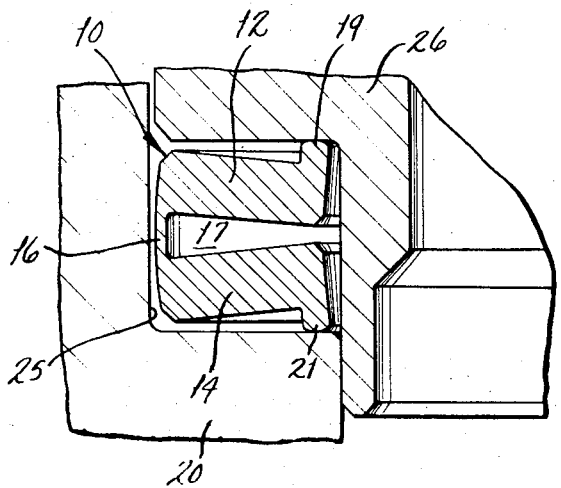
Figure 9:
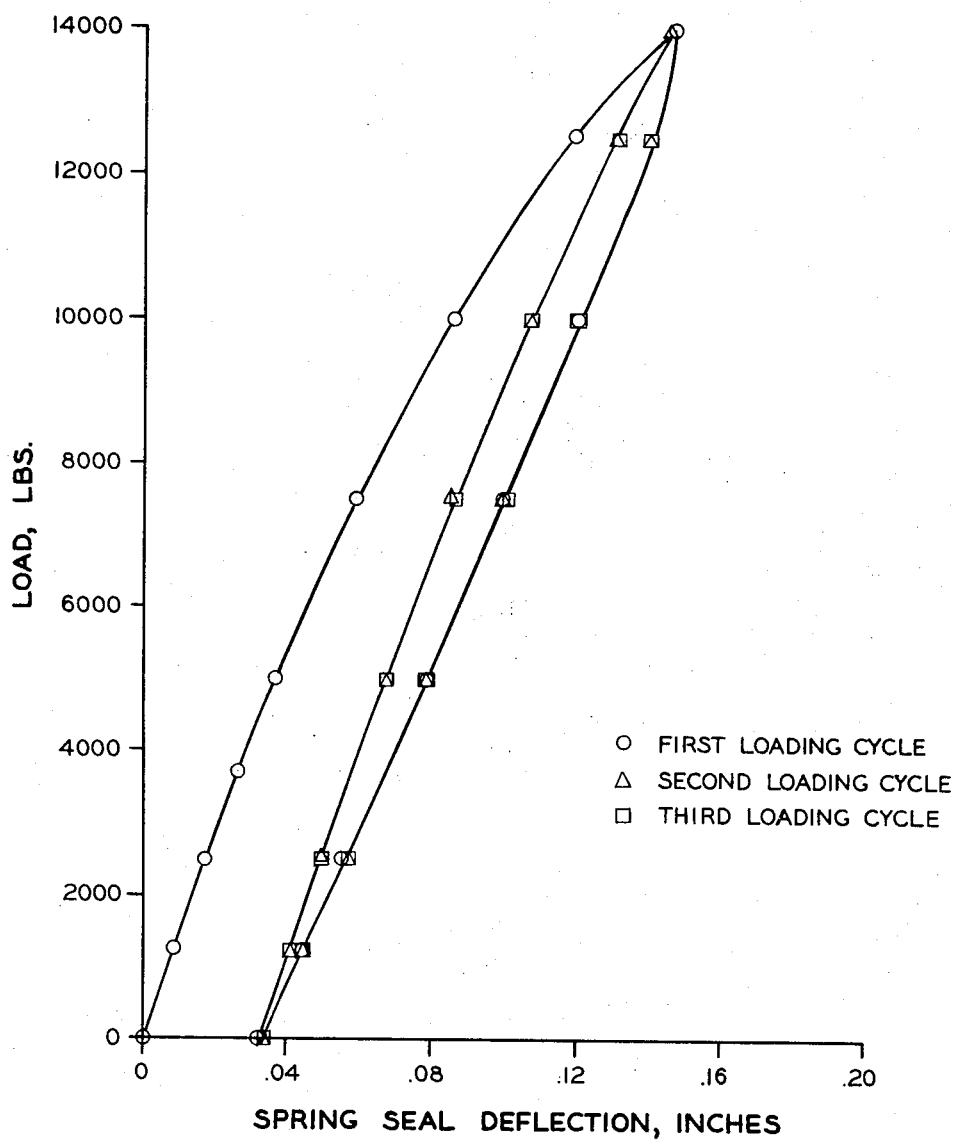
FIG. 9 is a graphical representation of the typical deflection vs. load characteristic of a spring seal of the present invention.

Referring now to FIGS. 2 and 3, there is shown a metal seal, generally designated 10, constructed in accordance with the present invention. The metal seal 10 is annular in its overall configuration and has a generally U-shaped cross-section. It is comprised of upper and lower elastically-deflectable, disk-like portions 12 and 14, respectively, joined together and spaced-apart from each other by an integrally formed, substantially plastically-deflectable, coupling or hinge portion 16 along its outer periphery. In this manner of construction, the seal 10 is provided with an internal-groove or opening 17 which is useful in applying pressure to spread the disk-like portions 12 and 14, thereby aiding in the sealing action. Preferably, the seal is formed from a metal having resilient, spring characteristics such as the metal alloy, commercially known as Inconel 718, having high yield strength at extreme temperatures, say 1000°F to 1200°F. It should be noted that the upper and lower disk-like portions 12 and 14 of the metal seal 10 are relatively thick in comparison to the cross-section hinge portion 16 so that, in use, the deformation of the hinge portion 16 is substantially plastic deformation (i.e. above the metal yield stress) while the deformation of the disk-like portions 12 and 14 is elastic deformation (i.e. less than the metal yield stress. I have found that for many metals and alloys it is necessary to design the metal seal 10 such that the ratio of the thickness of the disk-like upper and lower portions 12 and 14 to that of the thickness of the hinge portion 16 is at least greater than 1 to achieve the desired results. Preferably, for Inconel 718, I have found that the thickness of each of the upper and lower disk-like portions 12 and 14 should be about 8 times greater than the thickness of the hinge portion 16 of the metal seal 10 to obtain this result. In this manner, the seal 10 acquires spring-like characteristics which allows it to deflect and recover substantially, yet at the same time carry loads large enough to assure an effective seal. For example, a metal seal made in accordance with my invention having an overall thickness of about three-fourths inch, an outside diameter of about 5 inches, an inside diameter of about 3.5 inches, disk-like portions of about one-fourth inch thickness, and a hinge portion of about one thirty-second inch thickness, exhibited a load-deflection characteristic as illustrated in FIG. 8, wherein, after the initial loading, the seal deflected over a range of approximately 0.100 inch while sustaining a load of from 0 to 14,000 lbs.

It has been found that when the ratio of the thickness of the disk-like portions 12 and 14 to that of the hinge portion 16 is about 8 to 1, then the metal seal 10 takes on the desirable deflection and load-carrying characteristics because the hinge portion 16, rather than being a static member as in the case of the hinge portions for prior art metal seals, becomes a dynamic, plastic-like hinge. That is, the hinge 16 deflects in its plastic-stress region when the metal seal 10 is loaded and shares a portion of the load with the disk-like members 12 and 14. Thus, the metal seal 10 has the characteristic that it is capable of carrying substantial forces in its disk-like portions 12 and 14, yet at the same time is able to undergo the combination of substantial plastic deflection (due to hinge portion 16) and spring-like elastic deflection (due to disk-like portions 12 and 14). These characteristics and the advantages which are derived therefrom will become apparent from the description of the use of the metal seal 10 to seal mating parts of a control valve, to be described hereinafter.

The metal seal 10 is provided with annular lips 19 and 21 which protrude outwardly from the surface of the upper and lower load-carrying portions 12 and 14, respectively. These annular lips 19 and 21 serve to concentrate the sealing pressures which are applied to the surfaces of the parts to be sealed.

Figure 4:
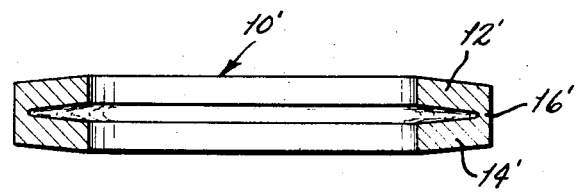
FIG. 4 is a cross-sectional view of an alternative embodiment of the seal of the present invention also useful in applications where internal seal pressure aids its sealing action.

In FIG. 4 there is shown an alternative seal 10' designed in accordance with the present invention. Instead of having a U-shaped cross-section, the spring seal 10' has a V-shaped cross-section. It should be noted, however, that in accordance with the present invention the hinge portion 16' of the seal 10' has a cross-sectional area which is much less than that of either of the disk-like portions 12' and 14'.

Figure 5:
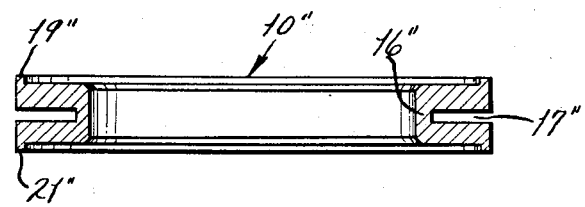
FIGS. 5 and 6 are cross-sectional views of seals similar in their general configuration to those of FIGS. 3 and 4, respectively, but wherein external seal pressure is employed to aid the sealing action thereof.
Figure 6:
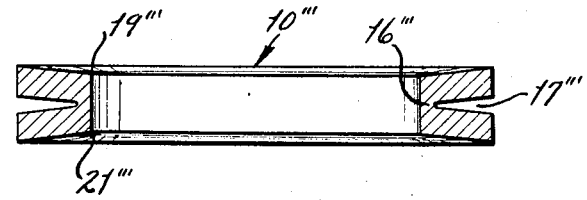

In FIGS. 5 and 6, metal seals similar to those of FIGS. 3 and 4 are shown. However, the seals 10'' and 10''' of FIG. 5 and 6 have their hinge portions 16'' and 16''' positioned along the inner diameter of the seal and their annular sealing lips 19'' and 19''' and 21'', 21''' formed along the outer diameter of the seal. In this manner, the grooves 17'', 17''' open outwardly so that external pressures applied to the seals 10'' and 10''', cause the disk-like portions 12'', 12''' and 14'', 14''' to spread apart to effect an enhanced seal between the annular lips 19'', 21'', 19''', 21''' and the parts to be sealed.

Figure 7:
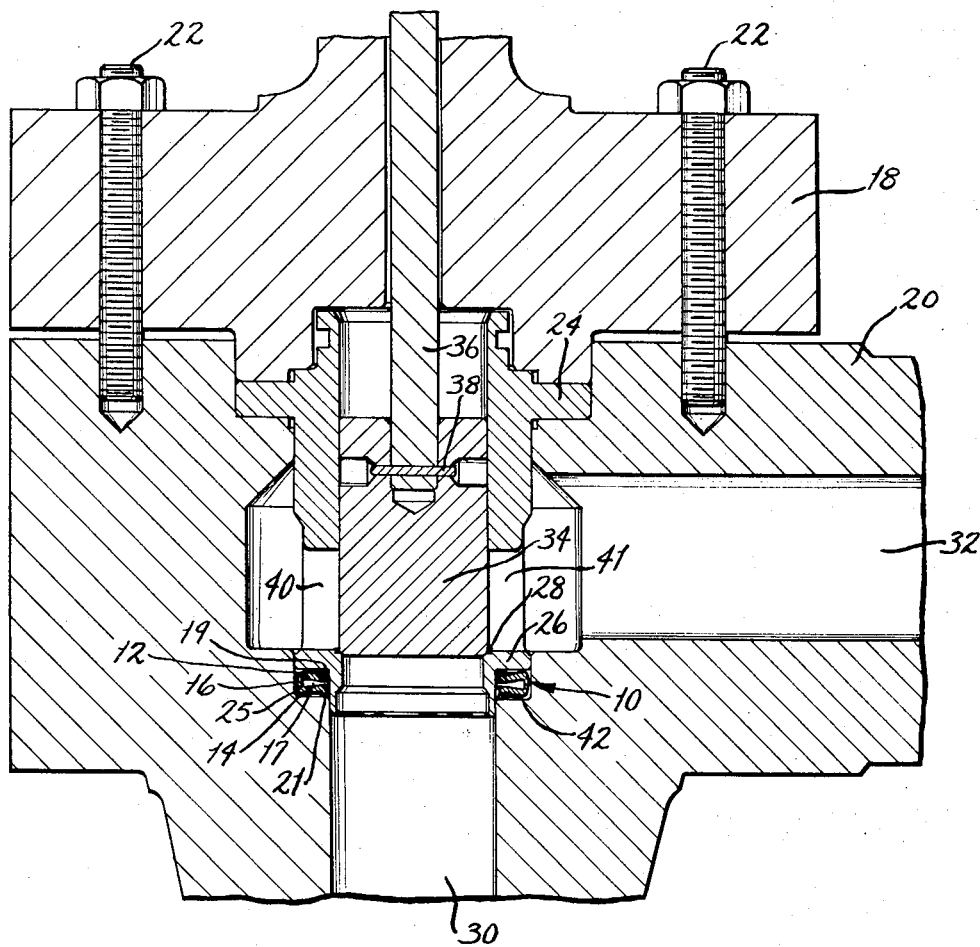
FIGS. 7 and 8 are cross-sectional views of a control valve fitted with a metal seal of the present invention to seal between mating parts thereof, FIG. 8 being an enlarged, partial cross-section of the seal and valve as shown in FIG. 7.

Referring now to FIGS. 7 and 8, there is shown, in partial cross-section, a portion of a control valve including a bonnet member 18 secured to a valve body 20 by means of bolts 22. Between the bonnet member 18 and the valve body 20, there is provided a cage member 24, the lower portion 26 of which is provided with an annular valve seat 28 which is positioned between the control valve inlet 30 and outlet 32. The cage member 24 is generally cylindrical in shape and includes flow passage windows 40 and 41. Reciprocally mounted within the cage member 24 for movement relative to the windows 40 and 41, is a cylindrical valve plug 34 having its upper end secured to a valve stem 36 by means of a fastening pin 38. As is well known, the valve stem 36 may be connected to an appropriate actuator (not shown). The valve plug 34 is designed to seat against the valve seat 28, in the closed position. Movement of the valve plug 34 away from this closed position meters the flow of fluid past the valve seat 28, through the windows 40, 41 of the cage member 24, to the valve outlet 32.

In a cavity 42 defined by the lower portion 26 of the cage 24 and a slot or groove 25 provided in the valve body 20, there is provided a metal seal 10 formed in accordance with the present invention. As shown, the metal seal 10 is deflected in its normal position with its sealing lips 19,21 mating against the lower portion 26 of the cage member 24 and the valve body 20, respectively, to provide an effective seal. It should be noted that the metal seal 10 is positioned in the cavity 42 such that high pressure from the valve inlet 30 tends to expand the seal 10 to urge its sealing lips tightly against the surfaces to be sealed.

In operation, where the valve body 20 and cage member 24 are subjected to temperature cycling, the cage member and valve body may first expand upon temperature increase, thereby applying a compression force to the metal seal 10 such that its upper and lower disk-like portions 12 and 14 and hinge portions 16 are deflected. The metal seal 10 of the present invention allows such deflection to take place readily because hinge portion 16 is sufficiently thin in comparison to the much thicker disk-like leg portions to undergo plastic deflection. As temperature cycling proceeds and the temperature decreases, the cage member 24 and the valve body 20 contract, usually at different rates, and thereby enlarge the cavity 42. The metal seal 10 recovers and follows such contraction readily, while continuing to exert sufficient sealing pressure to the parts. This results because the relatively large upper and lower disk-like portions 12 and 14 impart effective sealing forces to the parts and, in addition, a force sufficient to return the hinge portion 16 to its original shape. In this manner, the seal deflects readily to provide the necessary following or tracking movement. It should be apparent that the seal 10 is capable of substantial deflection, while at the same time, it maintains effective sealing pressures at the surface to be sealed.

Obviously, many modifications and variations of the metal seal of the present invention are possible in view of the above teachings. Therefore, it is to be understood that the invention may be practiced otherwise than as specifically described.

What is claimed is:

1. A one-piece self-supporting metal seal adapted for use in high temperature and pressure applications, comprising
    a unitary annular body of stiff, resilient metal having upper and lower disc-like portions joined by an integral hinge portion,
    the ratio of the thickness of the hinge portion to that of either of the disc-like portions being less than one such that said hinge portion is capable of substantial plastic deflection and said disc-like portions are capable of elastic deflection.

2. The metal seal as defined in claim 1, wherein the thickness of the upper and lower disk-like portions are substantially the same.

3. The metal seal as defined in claim 1, wherein the hinge portion is arranged to couple the upper and lower disk-like portions along the inner diameter of said annular body.

4. The metal seal as defined in claim 1, wherein the ratio of the thickness of the hinge portion to that of either of the disk-like portions is about 1 to 8.

5. The metal seal as defined in claim 1, wherein the hinge portion is arranged to couple said upper and lower disk-like portions along the outer diameter of said annular body.

* * * * *